H. C. SCHWARTZ.
FISH MOUTH OPENER AND HOLDER.
APPLICATION FILED MAR. 30, 1922.
1,433,041.
Patented Oct. 24, 1922.
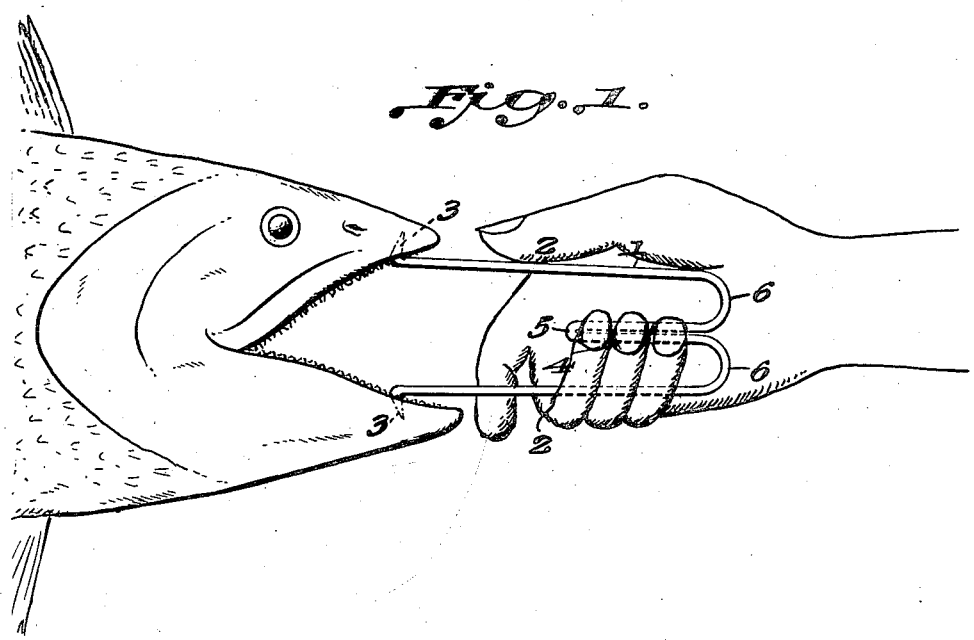
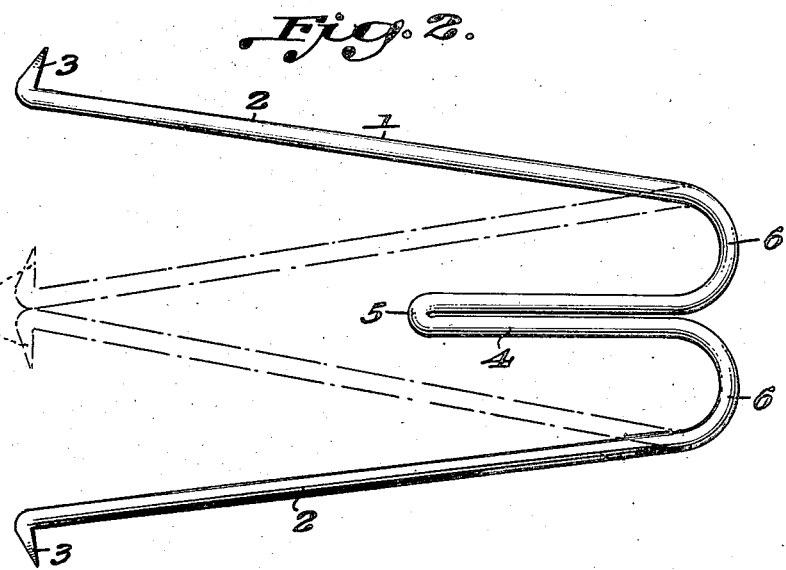

Patented Oct. 24, 1922.

1,433,041

UNITED STATES PATENT OFFICE.

HILBERT C. SCHWARTZ, OF PINE RIVER, MINNESOTA.

FISH-MOUTH OPENER AND HOLDER.

Application filed March 30, 1922. Serial No. 547,963.

*To all whom it may concern:*

Be it known that I, HILBERT C. SCHWARTZ, a citizen of the United States, residing at Pine River, in the county of Cass and State of Minnesota, have invented certain new and useful Improvements in Fish-Mouth Openers and Holders, of which the following is a specification.

This invention relates to a fish-mouth opening and holding appliance.

It has been proposed heretofore to provide appliances for opening the mouth of a fish so that the hook may be extracted and it is to this general class of device that my invention relates. So far as I am aware, there has not been provided heretofore a thoroughly practical appliance of this character which can be firmly and easily held in the hand of the fisherman and readily operated so that it may be inserted in the mouth of the fish without the necessity of grasping the fish with the other hand, nor easily removed from the fish's mouth. My object is to provide an extremely simple, inexpensive, and very efficient appliance made from a single piece of spring metal, preferably round spring steel, which is of an improved shape enabling the fisherman to retain a firm and easy grasp thereon by the action of the last three fingers of the hand pressing the device into the palm of the hand and enabling the user to operate the spreading arms not only by the thumb and forefinger but also by the "grip" of the hand whereby an even pressure is readily exerted for the purpose of contracting the arms when inserting the appliance in the fish's mouth or removing it therefrom.

The leading features of my invention are the divergent arms and improved bent part provided between the divergent arms by which the following functions and advantages are obtained: first, affording a "hold" or "grip" for engagement by the last three fingers of the hand by which the appliance is pressed into the hand and is easily held and operated without possibility of springing or slipping out of the hand; second, distribution of the spring-resistance throughout the entire device, affording three points for contraction and expansion and enabling the user to evenly distribute the pressure of the hand, particularly the thumb and forefinger, on the arms of the device and affording an even expansion and contraction during operation; third, the tool is reversible so that pre-adjustment to the hand and fingers is unnecessary.

Another object is to provide points which are canted backwardly in relation to the arms so that they will firmly engage the upper and lower parts of the mouth of the fish.

The novel bend provided in my appliance is unobtainable by the use of a coil, a plain angle bend, or an arcuate bend, the said bend serving the double purpose of increasing and distributing the resiliency and of affording a grip which enables the appliance to be easily and yet firmly held during its manipulation.

The present appliance operates humanely as it permits the fish's mouth to be opened and the hook to be easily extracted with only slight lacerations. The device is adapted for use as both an opener and holder and does away entirely with the necessity of grasping the fish with one hand while taking out the hook so that the fisherman is not subject to injuries to his hands by the fish's fins.

In the accompanying drawings:

Figure 1 is a view showing the manner of use of the invention; and

Figure 2 is a detail view thereof, dotted lines showing how the arms can be contracted.

The appliance is made from a single piece of spring metal, preferably round spring steel 1 of suitable gauge, and is formed with two divergent arms 2 having sharp points 3 at their ends, said points being canted back slightly so their inner faces are disposed at less than a right angle to the lengths of the arms 2. It is to be understood, however, that I do not limit myself to the exact angle of the points 3.

The essential feature of my invention resides in the entrant bend 4 which is a part of the stock of the appliance and comprises a doubled portion thereof extending inwardly a suitable distance, say less than one-half of the length of the appliance, to afford a proper hold of grip for the last three fingers of the hand. The parts of the bend 4 are substantially parallel in relatively close relation to each other and are preferably separated. By having the parts of the bend 4 separated except at its inner end 5, there is thereby obtained the advantage of an additional adaptability to expand and contract aside from the adaptability of the arms 2 to expand or to be contracted as shown in dotted lines. In its broadest aspect, however, I do not limit the invention to the bent portion 4 having parts which are separated as it is possible that they could lie in contact with each other.

The arms 2 join the entrant bent part 4 by curved parts 6. The relatively wide separation of the arms 2 from the bent part 4 and the provision of the rounded parts 6 affords adequate resiliency for the arms 2 so that they are sufficiently stiff in their springy action, nevertheless they can be easily drawn toward each other by the thumb and forefinger and pressure of the hand of the fisherman as represented by the dotted line showing.

The appliance being reversible, it can be taken into the hand without pre-determined adjustment, the last three fingers of the hand naturally pressing against the bent part 4 and forcing said part into the hand so that the device cannot slip and is so positioned that the "grip" of the hand, as well as the manipulating action of the thumb and forefinger are exerted on the arms 2. While the last three fingers press the bent part 4 into the hand, the forefinger and thumb may be readily manipulated to contract the arms 2 so that the points 3 may be inserted in the mouth of the fish without the necessity of holding the fish with the other end. Once the points 3 have been inserted, on releasing the arms 2, they expand into divergent position and hold the fish's mouth open as shown in Figure 1 so that the hook may be humanely removed without difficulty.

I claim:

1. A fish mouth opener and holder comprising connected, normally divergent, spring-actuated arms having free ends provided with mouth-engaging hooks, the convergent ends of said arms being bent to extend in relatively close, parallel, relation intermediate said arms and connected at their inner ends, said intermediate part constituting a fingerhold or grip which terminates part way of the length of said arms so that it will not interfere with the compression and expansion of the free parts of said arms.

2. A fish mouth opener and holder made from a single piece of springy metal comprising normally divergent arms having free ends provided with mouth-engaging hooks, the convergent ends of said arms being curved and formed into relatively close, parallel parts located intermediate said arms and connected by a bent part at their inner end, said parts constituting a finger hold or grip which terminates part way of the length of said arms so that it will not interfere with the compression and expansion of the free parts of said arms.

In testimony whereof I affix my signature.

HILBERT C. SCHWARTZ.